United States Patent

Olschewski et al.

[11] 4,352,419
[45] Oct. 5, 1982

[54] SELF CENTERING CLUTCH THRUST BEARING

[75] Inventors: Armin Olschewski, Schweinfurt; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 169,627

[22] Filed: Jul. 16, 1980

[30] Foreign Application Priority Data

Jul. 31, 1979 [DE] Fed. Rep. of Germany ....... 2931022

[51] Int. Cl.³ .............................................. F16D 23/14
[52] U.S. Cl. ................................. 192/98; 192/110 B; 308/233
[58] Field of Search ............... 192/98, 110 B; 308/233

[56] References Cited

U.S. PATENT DOCUMENTS

| | | | |
|---|---|---|---|
| 4,013,327 | 3/1977 | Kunkel et al. | 192/98 X |
| 4,094,394 | 6/1978 | Köder et al. | 192/98 |
| 4,099,605 | 7/1978 | Ernst et al. | 192/98 |

Primary Examiner—Rodney H. Bonck
Attorney, Agent, or Firm—Daniel M. Rosen

[57] ABSTRACT

A self centering clutch thrust bearing has a damping ring between one bearing ring and the sliding sleeve of a housing. The damping ring has resilient projections positioned to engage recesses in the housing with play, to damp small turning motions, and larger projections positioned to engage other recesses in the housing with play, to damp larger turning forces. The resilient projections are mounted to be operative in damping the forces prior to the larger projections.

This invention relates to self centering clutch thrust bearings, and more in particular to the provision of damping means in such bearings.

9 Claims, 5 Drawing Figures

SELF CENTERING CLUTCH THRUST BEARING

A self centering clutch thrust bearing is disclosed in U.S. Pat. No. 4,013,327, which provides radial play in or on a sliding housing. In the bore on the outer surface of at least the fixed bearing, a ring of an elastic material, such as a plastic, is provided. This ring has spring fingers in the bore or at the surface of the bearing, whereby radial play exists between the spring fingers and the sliding sleeve or the fixed bearing ring or the like.

The present invention is directed to the provision of a clutch thrust bearing having a damping ring, which provides good damping of shock and vibration, and which has a sufficiently high stiffness against movement in the circumferential direction.

Briefly stated, in accordance with the invention, high starting torque is absorbed in the damping ring by relatively large projections, while smaller resilient fingers are positioned to operate before the larger projections. The smaller projections serve only damping functions. As a result, the damping ring is not destroyed by the high starting torques. In one arrangement according to the invention, recesses in the slide housing are provided with inwardly converging side surfaces, which are engaged by the smaller resilient fingers during radial movement of the bearing. These recesses, in combination with the resilient fingers, provide the damping action.

In a further arrangement of the invention the projections are formed so that they can be assembled in the recesses in the housing without difficulty.

In order that the invention will be more clearly understood, it will now be disclosed in greater detail with reference to the accompanying drawings, wherein.

Figure 1:
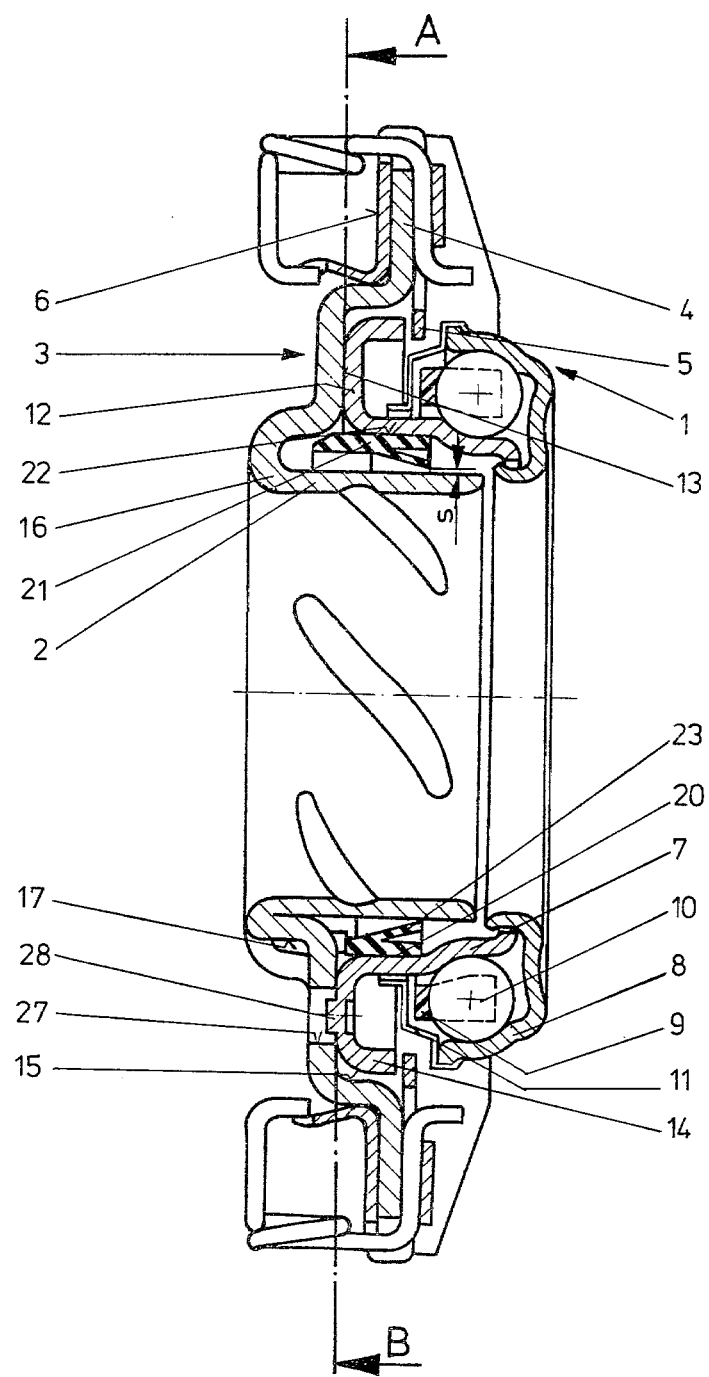
FIG. 1 is a section of a self centering clutch thrust bearing having a damping ring, which is secured against rotation in the bore of the inner ring, this figure being a section along the lines C-D of FIG. 2.
Figure 2:
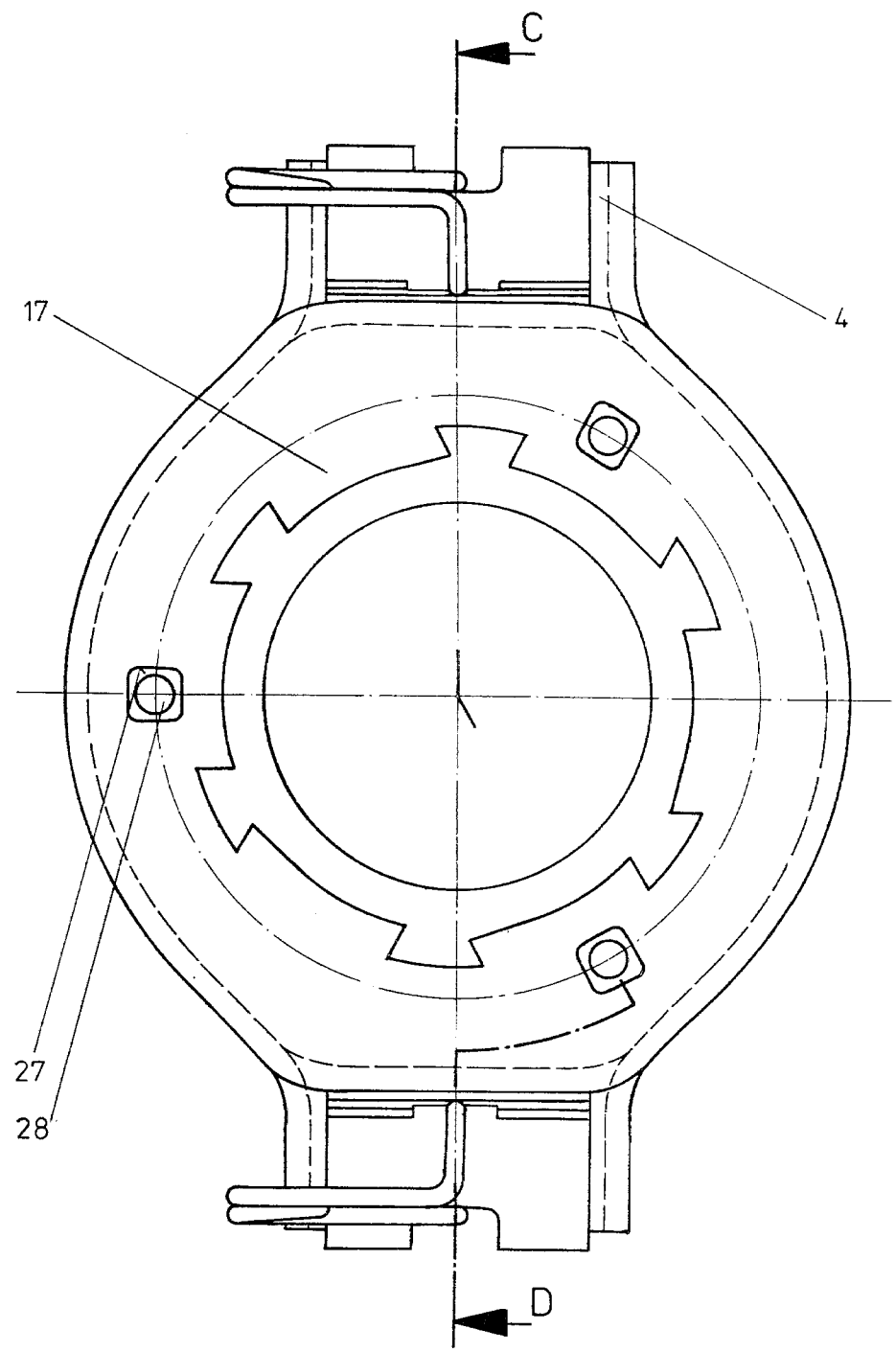
FIG. 2 is a side view of the self centering clutch thrust bearing of FIG. 1, taken from the left side.
Figure 3:
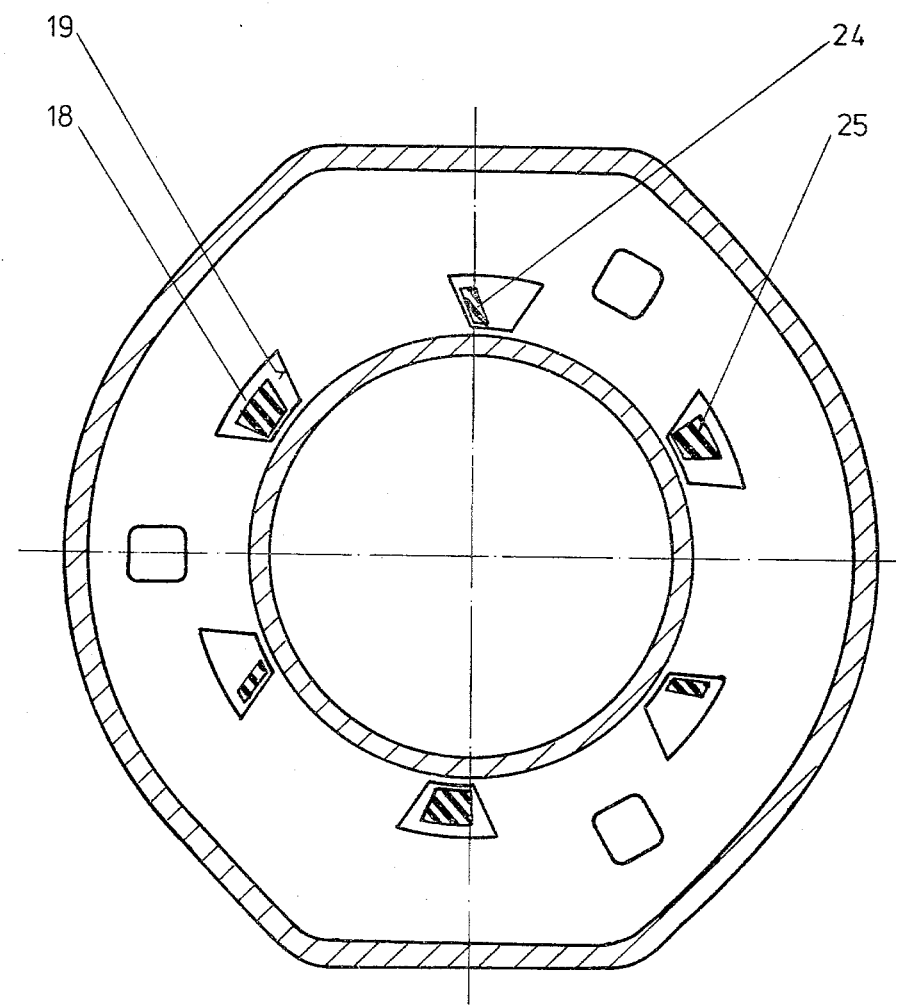
FIG. 3 is a cross-sectional view of the clutch thrust bearing of FIG. 1 taken along the lines A-B.
Figure 5:
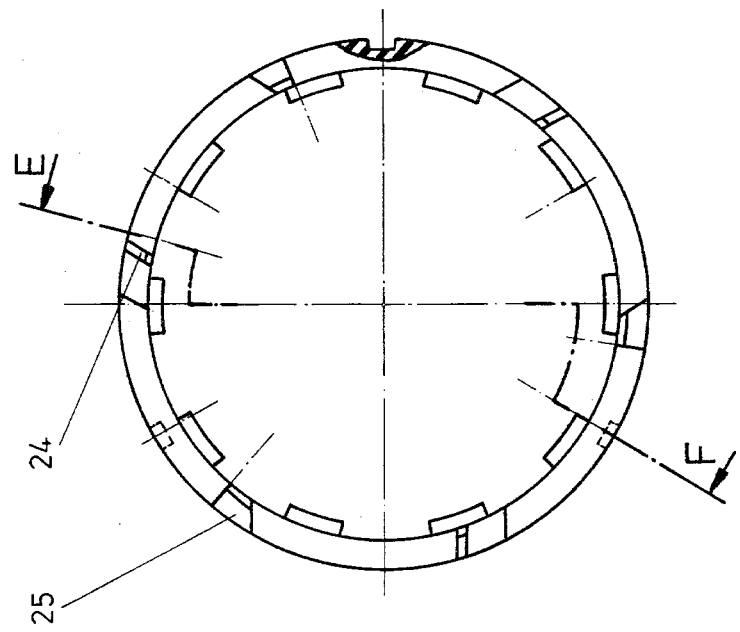
FIG. 5 is a side view of the damping ring of FIG. 4, taken from the left side.
Figure 4:
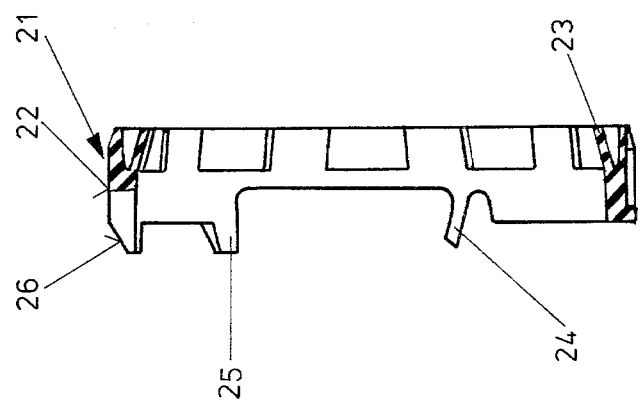
FIG. 4 is a cross-sectional view of the damping ring of FIG. 5, taken along the lines E-F.

Referring now to FIGS. 1-3 of the drawings, therein is illustrated a clutch thrust bearing 1 arranged on a sliding sleeve 2, the sliding sleeve being formed integrally with the housing 3 of the bearing. The housing 3 is provided with two radially outwardly directed extensions 4, which are covered by the holding elements 5. These holding elements serve for the axial positioning of the clutch thrust bearing 1, and have contact surfaces 6 for the clutch operating arrangement (not shown). The clutch thrust bearing 1 has sheet metal bearing rings 7 and 8, and balls 10 arranged in a cage 9, in the space between the bearing rings 7 and 8. The rotating outer bearing ring 8 has an annular concave surface adopted to engage the clutch levers (not shown). A cover piece 11 seals one side of this space, and may, for example, be affixed to one edge of the outer bearing ring 8. The inner ring 7 extends axially on the side toward the clutch, then it is angled to extend radially outwardly, with the outer end 14 thereof extending axially toward the clutch. The radially extending section 12 of the inner ring lies against the radially outwardly extending flange 13 of the housing 3, and is radially movable with respect to the housing 3. The outer axially extending portion 14 of the inner ring conforms to large radial movement of the clutch thrust bearing 1 due to the limit stop of the boring surface 15 of the housing 3. The housing 3 is connected to the sliding sleeve by way of a torus shaped section 16 which, in its outer surface, is provided with six recesses 17, thereby forming recesses 18 on the side thereof away from the clutch, the recesses having inwardly converging side surfaces 19, as seen in FIG. 3. A damping ring 21 of plastic material produced either by injection molding or casting, is arranged in the bore 20 of the inner ring 7, this damping ring being held against turning in the bore of the inner ring by suitable projections (not shown). These projections are arranged in the bore of the inner ring 7 and engage recesses (not shown) in the outer circumferential surface 22 of the damping ring 21. The damping ring is provided with a row of elastic fingers 23 in the bore, which are bent away from the clutch thrust bearing 1. In the center of clutch thrust bearing 1, a radial play s is provided between the fingers 23 and the sliding housing 2, so that a damping of the radial bearing displacement follows only when the displacement is greater than the play between the fingers and the sliding housing 2. As a result of this arrangement, the rolling bodies and the races of the bearing rings are protected from damage in the event of strong road shocks. This damping of the radial bearing displacement is supported by the spring projections 24. These projections 24 engage the recesses 18 with play and engage the inwardly converging side surfaces 19 of the recesses 18 in the event of radial movement of the clutch thrust bearing 1. These spring projections 24 serve also for damping the bearing movement against the turning of the running bearing ring 8. In the turning direction of the bearing ring 8, bearing movements are damped by the larger projections 25 on the ring 21, which likewise engage the recesses 18 of the housing 3 with play, and engage the converging side surfaces 19. By means of this arrangement, using resilient and larger projections 24, 25 respectively on the damping ring 21, the resilient spring projections 24 are required only for damping in the circumferential direction of small bearing movements, and thereby can not break. The projections 24, 25 are each provided with a beveled surface 26, so that they can be directed into the recesses 18 without difficulty. The housing 3 has, for example, three recesses 27 which receive projections 28 of the inner ring 7, which prevent extremely large movement of the inner ring 7 in the circumferential direction, as limit stops.

In the above description, it is indicated only that the projections 24 are resilient. Since the damping ring, from which both the projections 24 and 25 extend, may be resilient, it will be evident that the projections 25 may also be resilient. The important consideration, however, is that the fingers 24, serving a damping function, are preferably more resilient, and hence smaller in size, than the projections 25. The projections 25, on the other hand, serve primarily for absorbing larger torque, and hence must have a greater strength than the projections 24, and it is for this purpose that, in the preferred embodiment of the invention, these projections 25 are larger than the other projections. It is apparent, however, that the invention is not limited to this form of distinction, since the desirable properties may be achieved by other techniques.

While the invention has been disclosed and described with reference to a single embodiment, it will be apparent that variations may be made therein. Thus, changes are possible in the construction of the individual elements, within the scope of the invention. It is therefore intended in the following claims to cover each such variation and modification as follows within the true spirit and scope of the invention.

What is claimed is:

1. In a self centering clutch thrust bearing having rotating outer bearing ring means with an annular surface adapted to engage a clutch lever, fixed inner bearing ring means axially extending toward the clutch side of said bearing, a plurality of rolling bodies in a cage between said rotating and fixed bearing rings, a sliding housing having a sliding sleeve, and a surface adapted to axially engage said inner bearing ring means and have limited radial and circumferential movement with respect thereto, and a damping ring of resilient material between said inner bearing ring means and sliding sleeve, said damping ring having resilient fingers extending toward said sleeve, and wherein said inner ring means and sleeve are spaced sufficiently to permit radial play therebetween; the improvement wherein said damping ring, on the side thereof axially extending away from said clutch, has axially directed first projection means and axially directed second projection means, said projection means engaging recesses in said housing with play, said second projection means having less resiliency than said first projection means and being adapted to engage the sides of the respective recesses in said housing after said first projection means have engaged the sides of their respective recesses upon turning movements in said bearing.

2. The bearing of claim 1 wherein said damping ring is of a plastic material.

3. The bearing of claim 1 wherein said sleeve is within the bore of said inner ring means, and said damping ring is within the bore of said inner ring means radially outwardly of said sleeve.

4. The bearing of claim 1 wherein said fingers extend at an angle to the axis of said bearing.

5. The bearing of claim 1 wherein said first and second projection means comprise projections extending alternately from said damping ring.

6. The bearing of claim 5 wherein said second projection means are physically larger than said first projection means.

7. The bearing of claim 1 wherein said recesses are formed by impressions extending into said housing on the side thereof toward said clutch lever, the portion of said housing having said impressions being joined to said sleeve by a torus shaped section.

8. The bearing of claim 1 wherein said recesses in said housing have inwardly converging side walls.

9. The bearing of claim 1 wherein said first and second projection means comprise axially extending projections having inclined surfaces.

* * * * *